United States Patent
Mak

(10) Patent No.: US 7,980,081 B2
(45) Date of Patent: Jul. 19, 2011

(54) CONFIGURATIONS AND METHODS FOR LNG FUELED POWER PLANTS

(75) Inventor: John Mak, Santa Ana, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 465 days.

(21) Appl. No.: 11/721,236

(22) PCT Filed: Dec. 6, 2005

(86) PCT No.: PCT/US2005/044225
§ 371 (c)(1),
(2), (4) Date: Jun. 8, 2007

(87) PCT Pub. No.: WO2006/068832
PCT Pub. Date: Jun. 29, 2006

(65) Prior Publication Data
US 2009/0282836 A1    Nov. 19, 2009

Related U.S. Application Data

(60) Provisional application No. 60/660,000, filed on Mar. 8, 2005, provisional application No. 60/637,860, filed on Dec. 20, 2004.

(51) Int. Cl.
*F02G 3/00*          (2006.01)
*F02C 1/00*          (2006.01)
(52) U.S. Cl. .................... 60/779; 60/39.093; 60/728
(58) Field of Classification Search ............... 60/39.093, 60/39.465, 728, 772, 779; 415/178
See application file for complete search history.

(56) References Cited

U.S. PATENT DOCUMENTS

| | | | |
|---|---|---|---|
| 3,720,057 A | 3/1973 | Arenson | |
| 3,796,045 A | 3/1974 | Foster-Pegg | |
| 4,036,028 A | 7/1977 | Mandrin | |
| 4,231,226 A | 11/1980 | Griepentrog | |
| 5,083,423 A * | 1/1992 | Prochaska et al. | 60/772 |
| 5,457,951 A | 10/1995 | Johnson et al. | |
| 5,622,044 A * | 4/1997 | Bronicki et al. | 60/39.182 |
| 6,318,089 B1 | 11/2001 | Hiraga et al. | |
| 6,367,258 B1 | 4/2002 | Wen et al. | |
| 6,374,591 B1 | 4/2002 | Johnson et al. | |
| 2003/0005698 A1 | 1/2003 | Keller | |
| 2003/0182941 A1 | 10/2003 | Andrepont et al. | |

FOREIGN PATENT DOCUMENTS

| | | |
|---|---|---|
| EP | 0009387 | 9/1979 |
| EP | 0605159 | 12/1993 |
| EP | 0683847 | 9/1994 |
| EP | 0828925 | 5/1996 |
| WO | WO 95/16105 | 6/1995 |
| WO | WO 96/38656 | 12/1996 |
| WO | WO 01/07765 | 1/2001 |
| WO | WO 02/097252 | 12/2002 |
| WO | WO 2004/109180 | 12/2004 |
| WO | WO 2004/109206 | 12/2004 |

\* cited by examiner

*Primary Examiner* — Louis Casaregola
(74) *Attorney, Agent, or Firm* — Fish & Associates, PC

(57) ABSTRACT

Contemplated configurations and methods use first and second precoolers, preferably in alternating operation, to provide a combustion turbine with air at a temperature of 50° F., and more typically less than 32° F. and most typically less than 0° F. In such configurations and methods it is generally preferred that a heat transfer fluid circuit provides both, heated and cooled heat transfer fluid to thereby allow cooling and deicing of the precoolers. Most preferably, refrigeration is provided from an LNG regasification unit to form the cooled heat transfer fluid while heat from a power cycle (e.g., from surface condenser) is used to form the heated heat transfer fluid.

19 Claims, 3 Drawing Sheets

CONFIGURATIONS AND METHODS FOR LNG FUELED POWER PLANTS

This application claims priority to our copending U.S. provisional patent applications with the Ser. Nos. 60/637,860 and 60/660,000, which were filed Dec. 20, 2004 and Mar. 8, 2005, respectively, and which are incorporated by reference herein.

FIELD OF THE INVENTION

The field of the invention is integrated power generation using Liquefied Natural Gas (LNG), and especially power generation in LNG regasification facilities.

BACKGROUND OF THE INVENTION

LNG has recently gained significant attention as an alternative clean energy source as the cost of crude oil has reached historic highs. Thus, it is not surprising that global consumption of natural gas is projected to increase substantially in the coming years, and that the anticipated demand may not be met by domestic production. Natural gas shortage is further compounded by the retirement of older power plants and replacement with more efficient combined cycle power plants. To satisfy at least part of the increasing LNG demand, various LNG import terminals are being developed in North America, and existing facilities are expanded to accommodate a higher LNG throughput.

Use of LNG in a power plant as a fuel typically requires that the LNG is vaporized before combustion. Unfortunately, vaporization is an energy intensive process and typically requires a heat duty representing about 2 to 3% of the energy content in the LNG. While conventional LNG regasification facilities typically require an external heat source (e.g., seawater heater), the heat for vaporization may also be provided by a combustion process in a synergistic manner. For example, the vaporized LNG in an LNG regasification facility can be used to fuel a power plant, eliminating gas pipeline transmission costs, while the waste heat from the power plant can supply the heating duty of LNG. Thus, there are economic incentives to locate a power plant close to an LNG regasification terminal.

For example, U.S. Pat. Nos. 4,036,028 and 4,231,226 to Mandrin and Griepentrog, respectively, describe integration of a power plant with LNG regasification. Similar plants are reported in published U.S. Pat. App. No. 2003/0005698 and WO 02/097252 to Keller, U.S. Pat. No. 6,374,591, WO 96/38656, WO 95/16105, EP 0828925, and EP 0683847 to Johnson et al., and U.S. Pat. No. 6,367,258 and WO 01/07765 to Wen et al. Further substantially similar configurations are described in EP 0009387 to Mak or EP 0605159 to Tomlinson et al. In such known configurations, heat for regasification of LNG is provided by a heat exchange fluid, which is in thermal exchange with gas turbine intake, flue gas exhaust, and/or a working fluid of a power cycle. Such configurations are thought to improve the efficiency of the gas turbine cycle (Brayton cycle) by densifying the inlet air, thereby increasing its power output and efficiency. However, these processes are typically limited to cool the intake air to 40° F. (or higher) to avoid water freezing of the intake air.

Recently, various new configurations have been proposed that recover power at the LNG receiving terminal in which LNG is used as a heat sink for power generation, and/or as fuel to a power plant as described in our copending International patent applications with the serial numbers PCT/US03/25372 (published as WO 2004/109206) and PCT/US03/26805 (published as WO 2004/109180), and U.S. provisional patent application having Ser. No. 60/588,275, all of which are incorporated by reference herein.

It should be noted that while some of the above configurations provide benefits of reducing fuel consumption in LNG regasification using heat derived from gas turbine exhaust, the gain in power generation efficiencies is often not significant. Still further, and among yet other difficulties, heat transfer in some of these configurations is often limited by the freezing of water. Moreover, dislodging of ice particles from the turbine inlet tends to damage the gas turbine and disrupts power generation. Moreover, while the currently known gas turbine air pre-cool methods improve power generation efficiencies in hot climate regions (e.g., in the tropics or sub-tropics), they are often not suitable to colder climate regions (e.g., northeastern parts of North America). Even in relatively hot climate, such configurations provide efficiency benefits only in the summer months, with decreasing benefits in the winter seasons. Worse yet, in some cases operation of these units must be discontinued when the ambient temperatures drop below 40° F. to avoid water freezing at the air intake.

Therefore, while numerous processes and configurations for power plants with LNG utilization and/or regasification are known in the art, all of almost all of them suffer from one or more disadvantages. Thus, there is still a need to provide improved configurations and methods for power plants with LNG utilization and regasification.

SUMMARY OF THE INVENTION

The present invention is directed to combined cycle power plants with integrated LNG regasification in which power output is significantly improved by using refrigeration content in the LNG to deep chill intake air, typically below the freezing point of water, and to lower the steam condensation temperature and the pressure at the surface condenser of the steam driven power cycle. Intake air chilling is most preferably performed using two precoolers that operate in alternating manner such that one precooler is deiced using heated heat transfer fluid when the other precooler cools intake air using cooled heat transfer fluid.

In one aspect of the inventive subject matter, a plant includes a gas turbine that is coupled to a first and a second precooler, wherein the first and second precoolers are configured to provide chilled air to the gas turbine. A heat transfer fluid circuit is thermally coupled to the first and second precoolers, and a control system is configured to control alternate operation of the first and second precoolers. Most preferably, the control system is further configured to direct flow of a portion of cooled heat transfer fluid to the first precooler when a portion of heated heat transfer fluid flows to the second precooler.

In further typical embodiments of contemplated plants, an LNG regasification unit provides cooling to the heat transfer fluid to thereby form the cooled heat transfer fluid, and/or a steam driven power cycle provides heat to the heat transfer fluid to thereby form the heated heat transfer fluid (e.g., via condenser in a steam turbine cycle). While not limiting to the inventive subject matter, it is generally preferred that the chilled air has a temperature of less than 50° F., more typically less than 32° F., even more typically less than 10° F., and most typically less than 0° F.

Where desirable, the plant may further have a third precooler that is thermally coupled to the heat transfer fluid circuit and that is configured to provide cooled air to the first and/or second precooler. Most typically, the third precooler provides cooled air at a temperature of above 32° F. in a continuous manner to the first and/or second precooler, and may additionally be coupled to a recycling loop to recycle a portion of the heat transfer fluid.

In another aspect of the inventive subject matter, a plant includes a gas turbine that is coupled to a precooler, wherein the precooler provides chilled air having a temperature of less than 50° F. to the gas turbine. A control system is operationally coupled to the precooler and is configured to control delivery of a coolant and a heated medium to the precooler, wherein the control system is further configured such that the heated medium is provided to the precooler in response to a predetermined degree of ice formation in the precooler.

In especially preferred plants, the coolant is a cooled heat transfer fluid while the heated medium is a heated heat transfer fluid, and both, the cooled and heated heat transfer fluids are circulated in the same heat transfer fluid circuit. As pointed out above, the heat transfer fluid circuit in preferred plants is thermally coupled to an LNG regasification unit and/or a power cycle, and a second precooler may be included to provide chilled air having a temperature of less than 0° F. to the gas turbine (typically in alternating manner).

Therefore, a method of cooling combustion turbine intake air will include a step of providing a first precooler and a second precooler. In another step, the first and second precoolers are thermally coupled to a heat transfer fluid circuit in which cooled heat transfer fluid and heated heat transfer fluid circulate. In yet another step, a control system is coupled to the first and second precoolers, wherein the control system controls alternate operation of the first and second precoolers such that cooled heat transfer fluid is provided to the first precooler when heated heat transfer fluid is provided to the second precooler. Most typically, the step of thermally coupling comprises thermal coupling of the heat transfer fluid circuit to at least one of a LNG regasification unit and a combined power cycle.

In such methods, it is generally preferred that the LNG regasification unit provides cooling for the heat transfer fluid to thereby form the cooled heat transfer fluid, and that a surface condenser from the steam cycle of the combined cycle provides heating for the heat transfer fluid to thereby form the heated heat transfer fluid. Typically, the first and second precoolers provide cooled air to a combustion turbine at a temperature of less than 0° F. Where desirable, a third precooler may be included precooling air to a temperature of between 32° F. and ambient temperature and feeds the precooked air to at least one of the first and second precoolers. Most preferably, the third precooler is also thermally coupled to the heat transfer fluid circuit, and a recycling loop is configured to recycle a portion of heat transfer fluid from the third precooler back to the third precooler.

Various objects, features, aspects and advantages of the present invention will become more apparent from the following detailed description of preferred embodiments of the invention.

DETAILED DESCRIPTION

Figure 1:
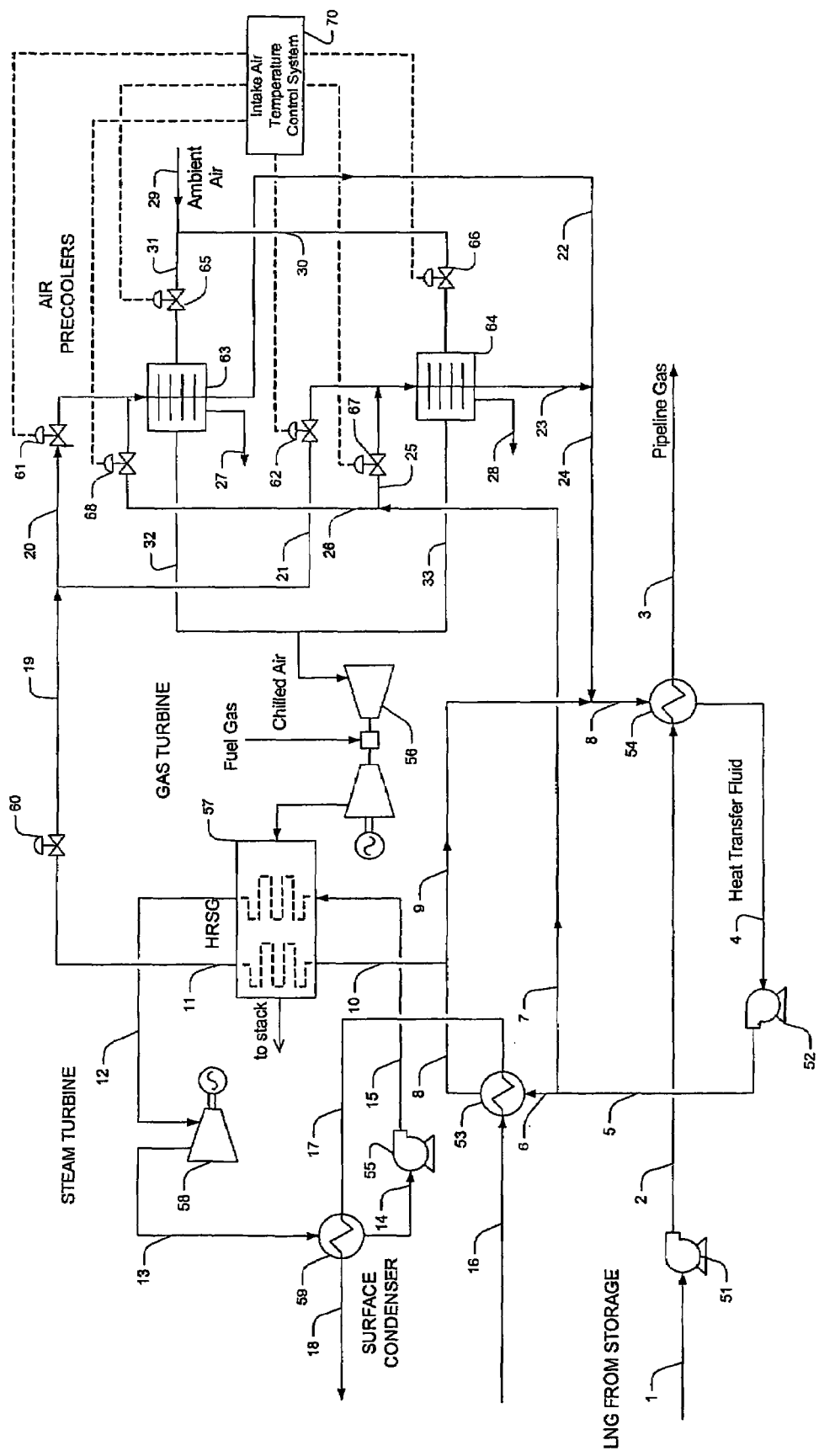
FIG. 1 is a schematic of an exemplary plant according to the inventive subject matter.

The inventor discovered that power output and efficiency in a combined cycle power plant can be substantially increased in a seasonally independent manner by integrating power generation with extraction of refrigeration content in LNG.

More specifically, LNG is regasified in a LNG regasification unit to thereby cool a heat transfer fluid. A first portion of the cooled heat transfer fluid is then used in a precooler to provide deep chilling of combustion turbine intake air to a temperature below 50° F., more typically below 32° F., and most typically below 0° F., while a second portion is used to cool the cooling water supplied to the working fluid (e.g., expanded steam) in a power cycle. The so warmed heat transfer fluid is further heated (e.g., in a HRSG) and then employed to deice frozen condensate formed in the precooler. Most typically, a second precooler is employed to maintain continuous operation of the combustion turbine and operated in an alternating manner with the first precooler. It should be particularly appreciated that such configurations will not only provide a substantial gain in power production and production efficiency, but will also uncouple a plant from seasonal or otherwise environmental changes.

In most preferred configurations, contemplated power plants have dual or multiple air intake coolers (precoolers) that chill gas turbine combustion air with the use of a heat transfer fluid in alternating cooling and defrosting (or deicing) modes. In further especially preferred configurations, LNG cold is employed to cool the gas turbine intake air while the gas turbine exhaust is employed for defrosting and deicing of the air precoolers. Depending on the particular configuration, it is contemplated that at least one of the intake air coolers will include multiple heat exchanger sections. Thus, the bulk of the moisture content from the intake air is condensed as a liquid phase in an upstream section while the subsequent section(s) further deep chill the already chilled air to a temperature that is below the water freezing temperature.

It should be particularly appreciated that in contemplated configurations and methods ice formation in the precooler is not only expected but tolerated to at least a predetermined degree. Ice is then removed from the heat exchanger using switching devices (e.g., switching valves, temperature and pressure controls, and timing devices) and piping configuration well known in the art to provide an unrestricted and continuous deep chilled air supply to the gas turbines. It should be especially noted that such configurations provide an increase in power output and generation efficiency under all climatic (winter to summer) conditions and global (tropical to cold climate) regions.

Therefore, contemplated plants will include a gas turbine that is coupled to a first and a second precooler, wherein the first and second precoolers are configured to provide chilled air to the gas turbine. A heat transfer fluid circuit is further thermally coupled to the first and second precoolers, and a control system is configured to control alternating operation of the first and second precoolers. Most preferably, the control system in such plants is configured to direct flow of a portion of cooled heat transfer fluid to the first precooler when a portion of heated heat transfer fluid flows to the second precooler. While not limiting to the inventive subject matter, it is typically preferred that LNG regasification unit is configured to provide cooling to the heat transfer fluid to thereby form the cooled heat transfer fluid.

In one exemplary aspect of the inventive subject matter as depicted in FIG. 1, LNG from storage (stream 1), typically at a sendout rate of 500 MMscfd to 1,500 MMscfd, is pressurized by LNG pump 51 to about 1,100 to 1500 psig forming stream 2. LNG is heated in the heat exchanger 54 of the LNG regasification unit, from −250° F. to about 40° F., forming stream 3 as required for pipeline transmission. A heat transfer fluid stream 8 (typically comprising a glycol water mixture) is cooled from typically 100 to 150° F. to typically −20 to −60° F. forming stream 4 that is pumped by the circulating pump 52 to about 120 psig forming stream 5 which is split into two portions, stream 7 and 6. The flow ratio between 7 and 6 depends on the cooling duty required by the air pre-coolers that is a function of ambient temperatures and gas turbine capacity. The flow rate of stream 7 relative to stream 6, controlled by control valve 67 and 68, is expected to be higher during summer months and lower during the winter seasons. Regardless of the ambient climatic conditions, the intake air stream 29, 30, and 31 is chilled to a very low temperature (e.g., 0° F. or lower) forming stream 32 and 33 feeding the gas turbine 56. The heat exchange tubes of air pre-cooler 63 and 64 are preferably configured to allow free draining of water condensate from the exchanger tubes, minimizing accumulation of water and the undesirable ice formation. Alternatively, or additionally, excessive buildup of ice can also be avoided by adjusting the cooling and defrosting cycle time and the use of multiple (two or more) precoolers. Thus, it should be recognized that unrestrictive and continuous cold air supply can be maintained, and power generation efficiency and output can be maximized at all times.

The dual air precoolers (or multiple air precoolers) are configured with at least one air precooler on the cooling mode and at least one on the heating or defrosting mode: When air precooler 63 is operating on the cooling cycle, control valve 68 is open and control valve 67 is closed directing the heat transfer medium (stream 26), typically at 0° F. to −40° F., to the air precooler 63. Simultaneously, control valve 65 is open and control valve 66 is closed directing the ambient air to air precooler 63. Intake air 31 is then cooled from ambient temperatures (typically ranging from 20° to 100° F.) to 0° F. or lower temperature, forming stream 32. Water condensate stream 27 is removed from the air pre-cooler, to avoid water accumulation on the heat exchanger surface, and minimize the undesirable ice formation. Stream 27 can be recovered as makeup water to the steam system in the combined cycle power plant.

Figure 2:
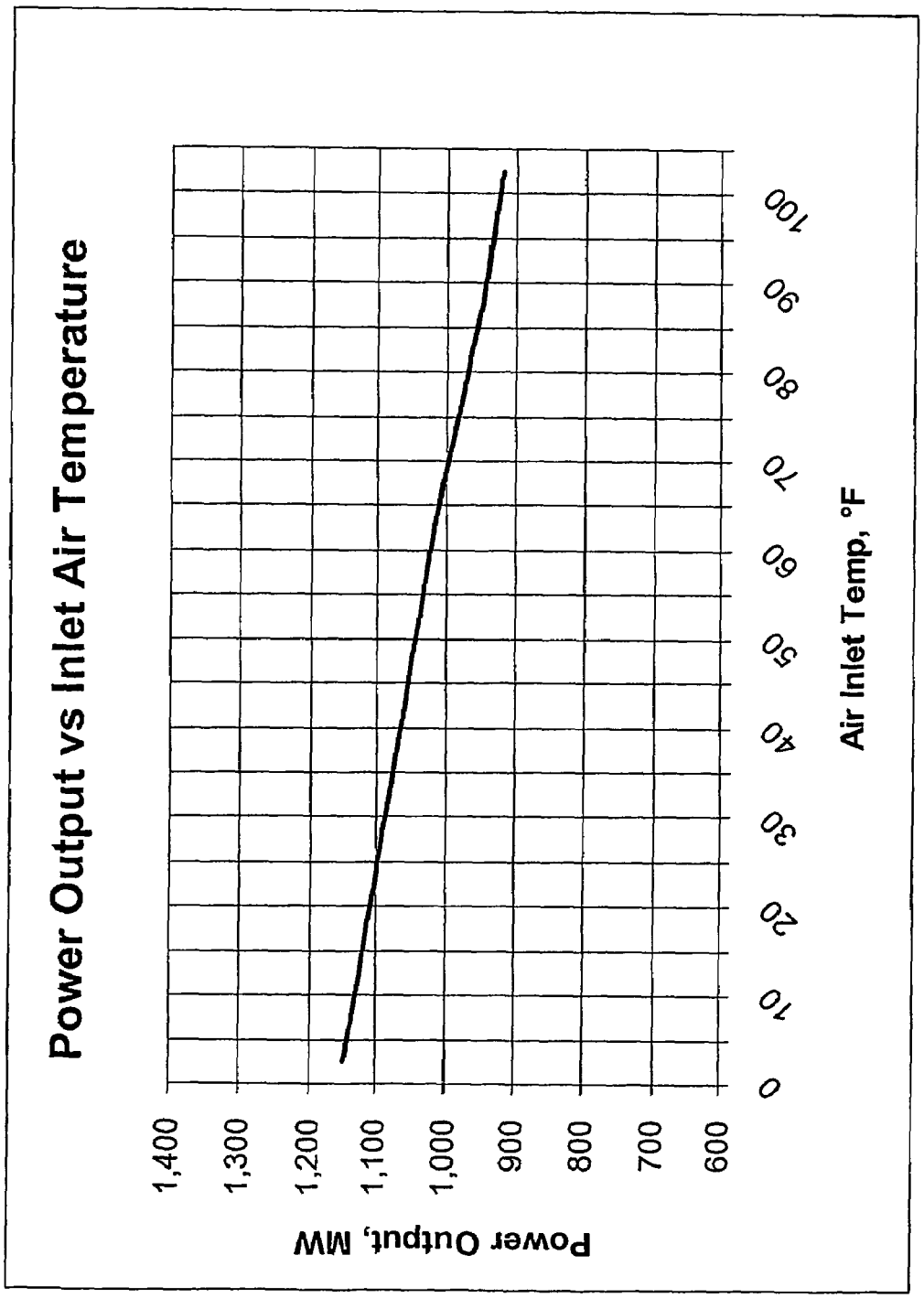
FIG. 2 shows an exemplary performance graph of a combined cycle power plant with gas turbine inlet cooling.

When air is chilled to the contemplated low temperatures, mass density of air increases resulting in an increase in air flow (as gas turbine operates on constant volumetric flow), that subsequently increases the gas turbine power output. Colder air temperature also improve the air compression efficiency, reducing the power consumption by the compressor section of the gas turbine, that subsequently increases the gas turbine (Brayton Cycle) power generation efficiency. This effect is illustrated in FIG. 2. Typically for every 3 to 5° F. decrease in air temperature, power output from the power plant is increased by about 1%. When ambient temperature is reduced from 100 to 0° F. during summer operation, the power output of a conventional combined cycle power plant can be increased by over 30%. This increase in power is mainly due to the higher thermodynamic efficiency that may vary with turbo-machinery designs. As shown in FIG. 2, the power plant output can be increased from 920 MW to 1150 MW with this air precooler step. The 230 MW increase in power output represents a significant increase in electricity power revenue, especially during summer months when the consumer demand peaks and electricity can be sold at a premium. During winter months, the increase in power is less, but the magnitude is still significant. For example, cooling the ambient air from 40° F. to 0° F. would result in over 10% increase in power output. As shown in FIG. 2, the power plant output can be increased from 1060 MW to 1150 MW with this air cooling step. The 90 MW represents a significant increase in power production and electric power revenue.

Although the air intake temperature after cooling is preferably at or below the freezing point of water (32° F.), it should be recognized that the intake temperature can be considerably further lowered. For example, contemplated configurations may be employed to chill air to 32° F. to 0° F., and more preferably to 0° F. to −20° F., and even lower for still further power generation. Thus, it should be appreciated that the lower limits are predominantly governed by the practical machinery design, aerodynamics, and/or material of construction that can be improved to operate at lower air temperatures.

While precooler 63 is on the cooling mode, precooler 64 is on the heating (defrosting) mode of operation. To supply heat to precooler 64, stream 6 is first heated by cooling water stream 16 in the steam cycle in exchanger 53 forming stream 8, which is then split into two portions, stream 9 and 10. Stream 9 is combined with other warm stream 22 and 23 (via 24) forming stream 8 prior to feeding into exchanger 54. A portion of heated stream 8 (here: Stream 10) is further heated in the HRSG 57 forming stream 11 having a temperature of about 100 to 150° F. Low level waste heat from the HRSG 57 is used in providing heating to stream 10. Since only waste heat is used, no impact on steam production and power output from the steam cycle (Rankine cycle) is expected. The flue gas exiting the stack is cooled to typically 230° F. or lower temperature. Stream 11 is controlled by control valve 60 forming 19, as needed to supply the heating requirement of the precoolers during the defrosting cycle. To defrost precooler 64, control valve 62 is open and valve 61 is closed, directing the warm stream 21 to precooler 64. As the precooler 64 is warmed up, ice formation on the exchanger tubes will be melted and removed from the air precooler 64 as water condensate stream 28 that can be recovered as makeup water to the steam system. Stream 21 is warmed up to about 50 to 80° F. exiting the precooler 64 as stream 23 that is further mixed with stream 22 to form stream 24, which is then combined with stream 9 to form stream 8.

When exchanger 64 is completely ice-free, the defrosting cycle is complete as indicated by temperature sensing devices in the precooler (not shown), it is then ready to be switched to operate on the air precool cycle. The inlet air temperature controller 70 preferably comprises control system and logics including timing cycle devices, pressure devices and temperature devices to automatically switching the precooler from the air precool mode to the defrosting mode and vice versa. Therefore, it should be recognized that contemplated control systems may operate in a non-adaptive and preprogrammed manner, but also in an adaptive manner in which the degree of ice build-up is measured. For example, non-adaptive control units may operate at a fixed schedule in which each of the precoolers operates for a predetermined time known or calculated to elapse for a particular degree of ice formation. Such fixed schedules may be modified according to climate data available at the location of the plant. Most typically, ice formation is reduced to a point before dislodging of fragments from the exchanger surfaces becomes critical. On the other hand, and especially where changes in humidity are relatively frequent, adaptive control units may measure ice build-up via temperature, conductivity, reflectivity, or other probes coupled to (or proximal to) the exchanger surface.

Therefore, contemplated plants typically include a gas turbine that is coupled to a precooler that provides chilled air (e.g., less than 20° F. and more typically less than 0° F.) to the gas turbine, wherein a control system is operationally coupled to the precooler and configured to control delivery of a coolant and a heated medium to the precooler. In such plants, the control system is typically configured such that the heated medium is provided to the precooler in response to a predetermined degree of ice formation in the precooler. While it is generally preferred that the cooled and the heated heat transfer medium are drawn from the same heat transfer circuit, it is also contemplated that the cooled and heated media may also be different. For example, and among other sources, the heated heat transfer medium may be condensate from the steam power cycle, boiler feed water, cooling medium from the HRSG, etc. Similarly, the cooled heat transfer medium may be from various alternative sources, and suitable sources include LNG (e.g., the portion that is used as fuel in the gas turbine), cold streams from a cryogenic process (e.g., nitrogen or hydrocarbons that are non-freezing at the cryogenic temperature), etc. Depending on the particular nature of the cooled and/or heated heat transfer medium, it should therefore be appreciated that the heat and cold sources may be the same or may vary considerably. However, it is generally preferred that the cold source is at least one of the refrigeration content in the LNG, and/or a cryogenic fluid in a downstream processing unit. Similarly, suitable heat sources may vary. However, especially preferred heat sources include those within the plant and most typically the HRSG, a separate combustor, and waste heat from a steam power cycle.

When precooler 64 operates on the air precool mode, precooler 63 is switched to operate on the defrosting mode that is initiated by the inlet air temperature controller 70. During this operation, control valve 65 is closed, and control valve 66 is open, directing air flow to precooler 64. Control valve 61 is open and control valve 62 is closed directing the warm heat transfer fluid (stream 20) to precooler 63. Simultaneously, control valve 68 is closed and control valve 67 is open directing the cold stream 25 to precooler 64. When exchanger 63 is completely ice-free, the defrosting cycle is complete as indicated by temperature sensible device in the exchanger (not shown) and the precooler is ready to be switched to operate on the cooling cycle.

It should be further recognized that (e.g., depending on the size of the air precoolers), two or more air precoolers can be used to accomplish the cooling and defrosting cycles. The control logics, valve switching functions, and direction of heat transfer fluid for cooling and defrosting as discussed above are also applicable to multiple air precooler units. Regardless of the particular number and arrangement of the precoolers, it is preferred that the precooled air is directly fed to combustion turbine 56.

Stream 6 is heated to about 70° F. using the cooling water supply to the steam power plant stream 16, which is cooled from typically 80° F. to about 60° F. forming stream 17, which is then heated in surface condenser 59 to stream 18. The colder cooling water in condenser 59 lowers the steam condensation temperature and operating pressure in surface condenser 59, typically 1 to 1.5 psia. Condensate 14 is then pumped to pressure at pump 55 to stream 15, which is then heated in heat recovery steam generator HRSG 57 to stream 12. Stream 12 is subsequently expanded in the steam turbine 58 to form expanded stream 13, which is condensed in condenser 59. The lower back pressure on the steam turbine results in an increase in power output from the steam turbine 58. The dual air precoolers (or multiple air precoolers) are configured with at least one air precooler on the cooling mode and at least one on the heating or defrosting mode: When air precooler 63 is operating on the cooling cycle, control valve 68 is open and control valve 67 is closed directing the heat transfer medium stream 26, typically at 0° F. to −40° F., to the air precooler 63. Simultaneously, control valve 65 is open and control valve 66 is closed directing the ambient air to air precooler 63. Intake air 31 is then cooled from ambient temperatures (ranging from 20° to 100° F.) to 0° F. or lower temperature, forming stream 32. Water condensate stream 27 is removed from the air pre-cooler, to avoid water accumulation on the heat exchanger surface, and minimize undesirable ice formation. Stream 27 can be recovered as makeup water to the steam system in the combined cycle power plant.

Figure 3:
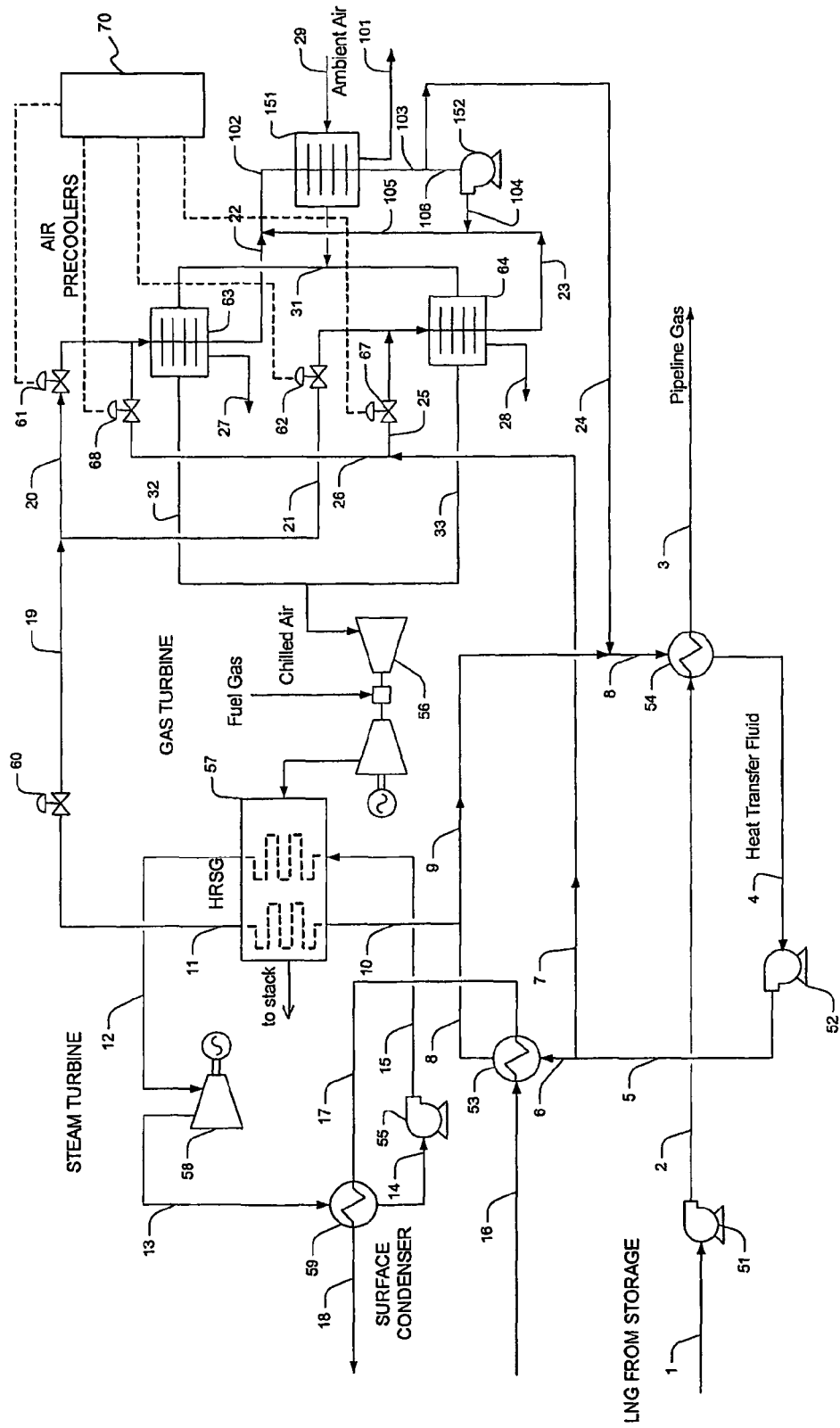
FIG. 3 is a schematic of an exemplary plant according to the inventive subject matter with sequential cooling and heat transfer medium recirculation.

A further particularly contemplated configuration is depicted in FIG. 3, in which the ambient air 29 is sequentially chilled in two steps. In such configuration, intake air is chilled using multiple heat exchanger sections 151, 63, and 64. Here, the bulk of the moisture content from the intake air 29 is condensed as a liquid phase stream 101 in first section 151. Typically, the condensed water is removed from the exchanger and recovered as condensate that may be used as makeup water to the steam boiler plant. The downstream sections 63 and 64 further deep chill the already chilled air 31 to below water freezing temperature (32° F.). Ice formed on the heat exchangers 63 and 64 is defrosted in sequential manner using switching devices and instrumentation and piping (e.g., switching valves, temperature and pressure controls, timing devices) as described in the configuration of FIG. 1 above to provide an unrestricted and continuous deeply chilled air supply to the gas turbines, resulting in a significant increase in power output and generation efficiency under all climatic conditions and global regions. Where desirable, intake control valves 65 and 66 (not shown) may be added as depicted in FIG. 1 above.

It is especially preferred that the heat transfer fluid circuit includes a glycol water based solution, wherein the re-circulation pump 152 is located close to the air chillers in the power plant to recirculate about 40% to 90% of the glycol fluid from the outlet of the first section air chiller stream 103 via stream 106. The stream 104 pumped by pump 152 is mixed with the outlet streams 22 and 23 from the intake air coolers 63 and 64, resulting in mixed stream 105 and 102 at a temperature typically between 32° F. and 45° F., thus effectively avoiding ice formation in the first section chiller 151. It should be particularly appreciated that such re-circulation system advantageously allows an extreme cold fluid stream 7 (−40° F., and even lower) to be used as the chilled glycol stream from the LNG vaporizers 54 from the regasification plant. The large temperature differential across the vaporizers significantly reduces the glycol flow rate, hence reducing the line size and cost of the transfer piping between the LNG regasification plant and the power plant sites. For example, without this recirculation loop, the glycol flow rate is 24,000 GPM for an inlet temperature of 0° F. When the temperature is deep chilled to −40° F., the glycol rate is reduced to below 13,000 gpm, which significantly reduces costs for the transfer lines between the two sites, especially where the sites are separated by a relatively long distance. With respect to the remaining components and numerals, the same considerations as described above for FIG. 1 apply.

Consequently, a method of cooling combustion turbine intake air will include one step in which a first and second precooler are provided. In another step, the first and the second precooler are thermally coupled to a heat transfer fluid circuit in which cooled heat transfer fluid and heated heat transfer fluid circulate. In still another step, a control system is operationally coupled to the first and second precoolers, wherein the control system controls alternating operation of the first and second precoolers such that cooled heat transfer fluid is provided to the first precooler when heated heat transfer fluid is provided to the second precooler. Most typically, an LNG regasification unit will provide cooling for the heat transfer fluid to thereby form the cooled heat transfer fluid, and a surface condenser of a steam power cycle will provide heating for the heat transfer fluid to thereby form the heated heat transfer fluid. In further especially contemplated aspects of the inventive subject matter, a third precooler is provided that delivers precooled and at least partially dehumidified air at a temperature of between 32° F. and ambient temperature to at least one of the first and second precoolers. Dehumidification is typically dependent on the actual humidity and set temperature for the third precooler. However, it is contemplated that the precooled air leaving the third precooler will typically be dehumidified at least 25%, more typically at least 50%, even more typically at least 70%, and most typically at least 80% (relative to humidity entering the third precooler).

With respect to suitable heat transfer fluids, it is contemplated that configurations and methods presented herein employ a heat transfer fluid suitable to vaporize LNG using waste heat from the combined cycle power plant. Applicable waste heat includes combustion air, cooling water, and flue gas from the gas turbine exhaust. Furthermore, the same heat transfer fluid is also preferably used to heat the air precoolers using gas turbine exhaust during the defrosting cycle. It should be recognized that contemplated configurations are adaptable to variable capacities of LNG sendout and different gas turbine sizes, and also adaptable to simple gas turbine cycles without steam power plants (e.g., in remote locations, or locations with limited space). Moreover, it should be noticed that contemplated plants can reuse water condensate from the intake air as makeup water to the boiler feed-water circuit in a steam power plant. Thus, the use of recovered condensate reduces or even eliminates water import to the steam power plant and waste discharges from boiler feed water treatment plants. It is also contemplated that the configurations presented herein can be adapted to retrofit an existing power plant and/or LNG regasification facility.

As significant quantities of refrigeration content is transferred from the LNG to the heat transfer fluid, it is generally preferred that the heat transfer fluid for the dual or multiple air intake coolers and/or the LNG regasification comprises a solution with relatively low (e.g., below 0° F.) freezing temperatures and favorable heat transfer characteristics. Most typically, suitable heat transfer fluids will be based on a mixture of glycol and water. Recirculation pumps for heat transfer fluids are preferably located close to the intake air coolers in the power plant. It should be appreciated that such re-circulation system significantly reduces the line size and cost of the transfer piping between the LNG regasification plant and the power plant sites, thereby significantly reducing the cost of the heat transfer system.

Viewed from an economic perspective, it should be appreciated that contemplated configurations will increase the efficiency and output of gas turbine based power plants, and requires significant less capital ($/MW installed power) and operating costs (fuel gas consumption) than currently known power plant configurations, while eliminating the need for LNG vaporizers.

Thus, specific embodiments and applications of LNG fueled power plants have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Furthermore, where a definition or use of a term in a reference, which is incorporated by reference herein is inconsistent or contrary to the definition of that term provided herein, the definition of that term provided herein applies and the definition of that term in the reference does not apply.

What is claimed is:

1. A plant comprising:
   a gas turbine that is coupled to a first and a second precooler, wherein the first and second precoolers are configured to provide chilled air to the gas turbine;
   a heat transfer fluid circuit thermally coupled to the first and a second precoolers;
   a control system that is configured to control alternating operation of the first and second precoolers; and
   wherein the control system is further configured to direct flow of a portion of cooled heat transfer fluid to the first precooler when a portion of heated heat transfer fluid flows to the second precooler.

2. The plant of claim 1 wherein an LNG regasification unit is configured to provide cooling to the heat transfer fluid to thereby form the cooled heat transfer fluid.

3. The plant of claim 1 wherein the chilled air has a temperature of less than 50° F.

4. The plant of claim 1 wherein a steam power cycle is configured to provide heat to the heat transfer fluid to thereby form the heated heat transfer fluid.

5. The plant of claim 4 wherein the steam power cycle comprises a cooling water system and a surface condenser in a steam turbine cycle.

6. The plant of claim 1 further comprising a third precooler that is thermally coupled to the heat transfer fluid circuit and that is configured to provide cooled air to at least one of the first and second precoolers.

7. The plant of claim 6 wherein the third precooler is configured to provide cooled air at a temperature of above 32° F. in a continuous manner.

8. The plant of claim 6 further comprising a recycling loop that is configured to recycle a portion of heat transfer fluid from the third precooler back to the third precooler.

9. A plant comprising:
   a gas turbine that is coupled to a precooler, wherein the precooler is configured to provide chilled air having a temperature of less than 50° F. to the gas turbine;
   a control system that is operationally coupled to the precooler and that is configured to control delivery of a coolant and a heated medium to the precooler; and
   wherein the control system is configured such that the heated medium is provided to the precooler in response to a predetermined degree of ice formation in the precooler.

10. The plant of claim 9 wherein the coolant is a cooled heat transfer fluid, wherein the heated medium is a heated heat transfer fluid, and wherein the cooled and heated heat transfer fluid are circulated in the same heat transfer fluid circuit.

11. The plant of claim 10 wherein the heat transfer fluid circuit is thermally coupled to at least one of a LNG regasification unit and a power cycle.

12. The plant of claim 9 further comprising a second precooler that is configured to provide chilled air having a temperature of less than 50° F. to the gas turbine.

13. The plant of claim 12 wherein the control system is configured to control delivery of the coolant to the precooler and the second precooler such that the precoolers operate in alternating manner.

14. A method of cooling combustion turbine intake air, comprising:
  providing a first precooler and a second precooler;
  thermally coupling the first and second precoolers to a heat transfer fluid circuit in which cooled heat transfer fluid and heated heat transfer fluid circulate;
  coupling a control system to the first and second precoolers, wherein the control system controls alternating operation of the first and second precoolers such that cooled heat transfer fluid is provided to the first precooler when heated heat transfer fluid is provided to the second precooler.

15. The method of claim 14 wherein the step of thermally coupling comprises thermal coupling of the heat transfer fluid circuit to at least one of a LNG regasification unit and a power cycle.

16. The method of claim 14 wherein the LNG regasification unit provides cooling for the heat transfer fluid to thereby form the cooled heat transfer fluid, and wherein a condenser provides heating for the heat transfer fluid to thereby form the heated heat transfer fluid.

17. The method of claim 14 wherein the first and second precoolers provide cooled air to a combustion turbine at a temperature of less than 50° F.

18. The method of claim 14 further comprising a step of providing a third precooler that provides precooled air at a temperature of between 32° F. and ambient temperature to at least one of the first and second precoolers.

19. The method of claim 18 wherein the third precooler is thermally coupled to the heat transfer fluid circuit, and wherein a recycling loop is configured to recycle a portion of heat transfer fluid from the third precooler back to the third precooler.

* * * * *